United States Patent
Dalmatov et al.

(10) Patent No.: US 11,340,816 B2
(45) Date of Patent: May 24, 2022

(54) DEALLOCATION OF DRIVE EXTENTS FOR MAPPED RAID (REDUNDANT ARRAY OF INDEPENDENT DISKS) EXTENTS

(71) Applicant: EMC IP Holding Company LLC, Hopkinton, MA (US)

(72) Inventors: Nickolay Dalmatov, Saint Petersburg (RU); Mikhail Danilov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 3 days.

(21) Appl. No.: 16/940,758

(22) Filed: Jul. 28, 2020

(65) Prior Publication Data

US 2021/0216230 A1    Jul. 15, 2021

(30) Foreign Application Priority Data

Jan. 14, 2020  (RU) ................................ 2020100899

(51) Int. Cl.
*G06F 3/06* (2006.01)
(52) U.S. Cl.
CPC .......... *G06F 3/0644* (2013.01); *G06F 3/0604* (2013.01); *G06F 3/0631* (2013.01); *G06F 3/0689* (2013.01)
(58) Field of Classification Search
None
See application file for complete search history.

(56) References Cited

U.S. PATENT DOCUMENTS

| | | | |
|---|---|---|---|
| 10,140,041 B1 * | 11/2018 | Dong | G06F 3/0619 |
| 10,146,624 B1 * | 12/2018 | Gong | G06F 11/142 |
| 10,289,306 B1 | 5/2019 | Feng et al. | |
| 10,891,060 B2 | 1/2021 | Tylik et al. | |
| 10,896,200 B1 | 1/2021 | Krishnan et al. | |
| 11,048,632 B2 | 6/2021 | Armangau et al. | |
| 11,144,252 B2 | 10/2021 | Shveidel et al. | |
| 11,200,082 B2 | 12/2021 | Gupta et al. | |
| 2009/0037656 A1 * | 2/2009 | Suetsugu | G06F 11/1096 711/114 |

* cited by examiner

*Primary Examiner* — Arpan P. Savla
*Assistant Examiner* — Edmund H Kwong
(74) *Attorney, Agent, or Firm* — BainwoodHuang

(57) ABSTRACT

A mapped RAID system with a protection group of physical data storage drives calculates an affinity value for each pair of physical data storage drives in the protection group that is equal to a total number of RAID extents to which at least one drive extent is allocated from each of the physical data storage drives in the pair. A change from a previous level of RAID protection to a new level of RAID protection provided by one of the RAID extents is detected. The new level of RAID protection provided by the RAID extent uses fewer drive extents than the previous level of RAID protection provided by the RAID extent. The disclosed technology selects one of the drive extents previously allocated to the RAID extent for deallocation such that the range of the affinity values is minimized after deallocation of the drive extent.

20 Claims, 4 Drawing Sheets

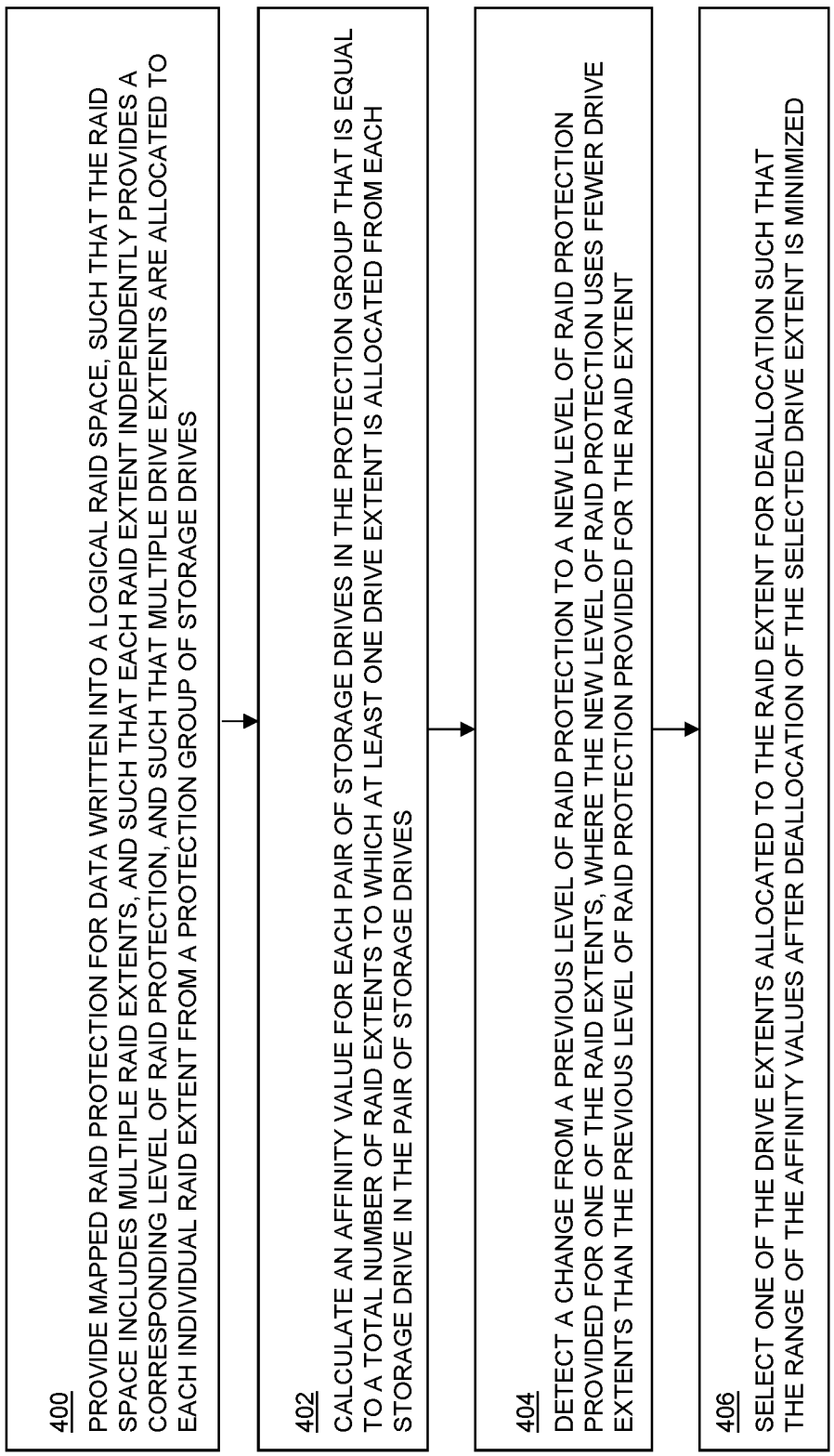

DEALLOCATION OF DRIVE EXTENTS FOR MAPPED RAID (REDUNDANT ARRAY OF INDEPENDENT DISKS) EXTENTS

RELATED APPLICATIONS

This application claims priority to Russian Patent Application number 2020100899, filed in the Russian Patent Office on Jan. 14, 2020, entitled DEALLOCATION OF DRIVE EXTENTS FOR MAPPED RAID (REDUNDANT ARRAY OF INDEPENDENT DISKS) EXTENTS, the entire contents of which is hereby incorporated herein by reference.

TECHNICAL FIELD

The present disclosure relates generally to intelligent data storage systems that provide mapped RAID (Redundant Array of Independent Disks) data protection, and more specifically to technology for deallocating drive extents from mapped RAID extents contained in a RAID space in response to decreases in RAID levels provided for the RAID extents.

BACKGROUND

Data storage systems are arrangements of hardware and software that may include one or more storage processors coupled to non-volatile data storage drives, such as solid state drives and/or magnetic disk drives. The storage processors service host I/O operations received from physical and/or virtual host machines ("hosts"). The received I/O operations may specify one or more storage objects (e.g. logical disks or "LUNs") hosted by the storage system that are written to and read from by the hosts. The storage processors run software that manages incoming I/O operations and performs various data processing tasks to organize and secure host data that is received from the host machines and stored on the non-volatile data storage drives.

Some data storage systems provide RAID (Redundant Array of Independent Disks) technology. Traditional RAID is a data storage virtualization/protection technology that combines multiple physical drives into a single logical unit to provide data redundancy and/or performance improvement. Data may be distributed across the drives using one of several RAID technologies, referred to as RAID levels, depending on the desired levels of redundancy and performance. Some RAID levels employ data striping ("striping"). In general, striping involves segmenting received host data into logically sequential blocks (e.g. sequential blocks in a logical address space of a logical storage object), and then storing data written to consecutive blocks in the logical sequence of blocks onto different drives. A series of consecutive logically sequential data blocks that are stored across different drives is referred to as a RAID "stripe". By spreading data segments across multiple drives that can be accessed concurrently, total data throughput can be increased.

Some RAID levels employ a "parity" error protection scheme to provide fault tolerance. When parity protection is used, one or more additional parity blocks are maintained in each stripe. For example, a parity block for a stripe may be maintained that is the result of performing a bitwise exclusive "OR" (XOR) operation across the data blocks of the stripe. When the storage for a data block in the stripe fails, e.g. due to a drive failure, the lost data block can be recovered by performing an XOR operation across the remaining data blocks and the parity block.

One example of a RAID level that uses block level striping with distributed parity error protection is 4D+1P ("four data plus one parity") RAID-5. In 4D+1P RAID-5, each stripe consists of 4 data blocks and a block of parity information. In a traditional 4D+1P RAID-5 disk group, at least five storage disks are used to store the data and parity information, so that each one of the four data blocks and the parity information for each stripe can be stored on a different disk. A spare disk may also be kept available to handle disk failures. In the event that one of the disks fails, the data stored on the failed disk can be rebuilt onto the spare disk by performing XOR operations on the remaining data blocks and the parity information on a per-stripe basis. 4D+1P RAID-5 is generally considered to be effective in preventing data loss in the case of single disk failures. However, data may be lost when two or more disks fail concurrently.

Other RAID levels may provide a higher level of data protection, e.g. data protection even in the event that multiple disks fail concurrently. For example, 4D+2P RAID-6 provides striping with double distributed parity information that is provided on a per-stripe basis. The double parity information maintained by 4D+2P RAID-6 enables data protection for up to a maximum of two concurrently failing drives.

SUMMARY

Data storage systems providing traditional RAID (Redundant Array of Independent Disks) data protection have significant technical limitations, including limitations with regard to the ability to conveniently add new drives. Specifically, traditional RAID systems have not supported the addition of new drives on an individual disk basis, but have instead required that new storage capacity be added only in increments equal to the number of drives that is required to support the specific RAID configuration, i.e. equal to the width of the RAID stripe being used. Accordingly, for 4D+1P RAID-5 level technology, new drives can only be added to a traditional RAID system in increments of five drives at a time. For 4D+2P RAID-6 technology, new drives can only be added to traditional RAID systems in increments of six drives. As the capacity of individual drives has increased over time with the introduction of new storage technologies, the inflexibility of traditional RAID systems with regard to adding new capacity has become increasingly burdensome and impractical.

Mapped RAID technology improves on traditional RAID technology by allowing for the addition of individual storage drives to a RAID protected data storage system in order to conveniently increase storage capacity. In mapped RAID technology, each physical data storage drive is divided into multiple contiguous regions of physical non-volatile data storage referred to as "drive extents". Sets of drive extents are allocated from physical data storage drives to logical "RAID extents" through a drive extent pool. The number of drive extents allocated to each RAID extent is the same as the number of disks used in a traditional RAID system to store data blocks and parity information for the same RAID level that is provided by the RAID extent. Data structures such as one or more RAID mapping tables are used to associate sets of allocated drive extents with their corresponding RAID extents. Multiple RAID extents may be provided as logically contiguous regions contained in a larger logical address space referred to as a "RAID space". Host I/O operations may result in I/O operations that indicate logical addresses within the RAID space. Each logical address is mapped by mapping logic to a specific RAID extent in the RAID space, and to corresponding physical locations within the set of drive extents that are allocated to that RAID extent. In order for mapped RAID to operate correctly, each drive extent with the set of drive extents allocated to an individual RAID extent must be located on a different physical data storage drive.

Each RAID extent contained in the RAID space provides a corresponding level of RAID protection. Accordingly, different RAID extents in the RAID space may provide different levels of RAID protection. Because the set of drive extents allocated to an individual RAID extent store blocks of data and parity information in stripes that are defined by the specific RAID level corresponding to the RAID extent, RAID extents with different corresponding RAID levels are allocated different numbers of drive extents. For example, a RAID extent providing 4D+1P RAID-5 protection is allocated five drive extents in order to store the four blocks of data and one block of parity information contained in each stripe defined by 4D+1P RAID-5 across different drive extents. In another example, a RAID extent providing 4D+2P RAID-6 level RAID protection is allocated five drive extents in order to store the four blocks of data and two blocks of parity information in each stripe defined by 4D+2P RAID-6 across different drive extents.

The corresponding level of RAID protection provided by individual RAID extents may be changed dynamically. For example, the corresponding level of RAID protection provided by a RAID extent may be automatically changed in response to detecting a change in a faultiness level of the physical data storage drives that contain the drive extents allocated to the RAID extent. The faultiness level of a physical data storage drive may, for example, include or consist of an indication of the likelihood that the physical data storage drive will fail during the processing of an I/O operation. Higher faultiness levels indicate a higher likelihood of failure, and lower faultiness levels indicate a lower likelihood of failure.

In response to detecting an increase in the faultiness level(s) of the physical drives containing the drive extents allocated to a RAID extent, the corresponding level of RAID protection provided by the RAID extent may be increased. For example, in response to detecting an increase in the faultiness level(s) of the physical drives containing the drive extents allocated to a RAID extent, the corresponding level of RAID protection provided by that RAID extent may be increased from 4D+1P RAID-5 to 4D+2P RAID-6.

The faultiness level(s) of the data storage drives that contain the drive extents allocated to a RAID extent may, for example, increase over time due to degradation in the performance of the data storage drives over time.

For example, an increase in the faultiness level(s) of the physical data storage drives containing the drive extents allocated to a RAID extent may be detected when the physical data storage drives are solid state drives and a total amount of writes performed to each drive exceeds a threshold amount. In another example, an increase in the faultiness level(s) of the physical data storage drives containing the drive extents allocated to a RAID extent may be detected when an error rate detected for I/O operations performed on each drive exceeds a threshold error rate.

In response to detecting a decrease in the faultiness level(s) of the physical drives containing the drive extents allocated to a RAID extent, the corresponding level of RAID protection provided by the RAID extent may be decreased.

For example, in response to detecting a decrease in the faultiness level(s) of the physical drives containing the drive extents allocated to a RAID extent, the corresponding level of RAID protection provided by the RAID extent may be decreased from 4D+2P RAID-6 to 4D+1P RAID-5.

The faultiness level(s) of the data storage drives that contain the drive extents allocated to a RAID extent may, for example, decrease over time due to replacement of the drive extents previously allocated to the RAID extent with newly allocated drive extents, e.g. with drive extents that are contained in relatively newer physical data storage devices with respect to the physical data storage devices containing the previously allocated drive extents. Such replacement of previously allocated drive extents with newly allocated drive extents may, for example, include copying of previously stored host data from the previously allocated drive extents to the newly allocated drive extents, and may be performed as part of or during a load balancing operation that may be performed to better balance the relative utilization of resources within the data storage system.

For example, relatively newer (e.g. more recently added) physical data storage drives may, for example, have a relatively lower faultiness level because they are each solid state drives with a total amount of previously performed write operations that is less than the threshold amount. In another example, relatively newer physical data storage drives may have relatively lower faultiness levels because they each have an error rate for I/O operations that are performed on them that is less than a threshold error rate.

When the corresponding level of RAID protection provided by a RAID extent is increased, the number of drive extents allocated to the RAID extent may be increased. For example, in the case where the corresponding level of RAID protection provided by a RAID extent is increased from 4D+1P RAID-5 to 4D+2P RAID-6, the number of drive extents allocated to the RAID extent is increased from five to six. When the corresponding level of RAID protection provided by a RAID extent is decreased, the number of drive extents allocated to the RAID extent may be decreased. For example, in the case where the corresponding level of RAID protection provided by a RAID extent is decreased from 4D+2P RAID-6 to 4D+1P RAID-5, the number of drive extents allocated to the RAID extent may be decreased from six to five.

In some cases, RAID extents may become unevenly distributed across the physical non-volatile data storage drives. In such situations, the uneven distribution of RAID extents across the physical data storage drives may potentially reduce the number of drives that are able to participate in the drive rebuilding process performed in the event of a drive failure. The lower the number of drives that are potentially able to participate in the drive rebuilding process, the longer the time required to perform the drive rebuilding process, and accordingly the more likely that a second drive will fail during the drive rebuilding process, potentially resulting in data loss. The disclosed technology addresses this problem automatically at the time that the number of drive extents allocated to a RAID extent is decreased. In the disclosed technology, when the number of drive extents allocated to a RAID extent is decreased, one of the previously allocated drive extents is selected for deallocation such that the distribution of RAID extents across the physical non-volatile data storage drives is kept as even as possible, thus keeping the number of drives that participate in the dive rebuilding process as high as possible, in order to minimize the time required to perform the drive rebuilding process, and thus minimize the probability that a second physical data storage drive will fail during the failure recovery process.

The disclosed technology provides mapped RAID protection for data written to a logical RAID space that includes multiple RAID extents. Each RAID extent in the RAID space independently provides a corresponding level of RAID protection, and multiple drive extents are allocated to each individual RAID extent from a protection group of storage drives. The disclosed technology calculates an affinity value for each pair of physical data storage drives in the protection group that is equal to a total number of RAID extents to which at least one drive extent is allocated from each of the physical data storage drives in the pair of physical data storage drives. The disclosed technology detects a change from a previous level of RAID protection to a new level of RAID protection provided for one of the RAID extents in the RAID space. The new level of RAID protection that is detected uses fewer drive extents than the previous level of RAID protection provided for the RAID extent. The disclosed technology selects one of the drive extents previously allocated to the RAID extent for deallocation such that the range of the calculated affinity values (i.e. the difference between the highest and lowest affinity values) is minimized after deallocation of the drive extent.

In some embodiments, calculating the affinity value for each pair of storage drives in the protection group may include generating an affinity matrix for the protection group. Each element in the affinity matrix for the protection group corresponds to a pair of storage drives contained in the protection group. Each element in the affinity matrix stores a value equal to the total number of RAID extents in the RAID space to which are allocated i) at least one drive extent contained in a first one of the physical data storage drives in the corresponding pair of physical data storage drives, and ii) at least one drive extent contained in a second one of the physical data storage drives in the corresponding pair of physical data storage drives.

In some embodiments, one of the drive extents allocated to the RAID extent may be selected for deallocation such that the range of the affinity values after deallocation of the drive extent is minimized at least in part by selecting one of the drive extents allocated to the RAID extent for deallocation such that the range of the values stored in the elements of the affinity matrix after deallocation of the drive extent is minimized.

In some embodiments, the new level of RAID protection for the RAID extent may provide a lower level of RAID protection for the RAID extent than the previous level of RAID protection.

In some embodiments, a list may be received indicating multiple RAID extents in the RAID space for which a previous level of RAID protection is being changed to a new level of RAID protection. The disclosed technology identifies those RAID extents in the list for which the new level of RAID protection uses fewer drive extents than the previous level of RAID protection. For each of those RAID extents in the list for which the new level of RAID protection uses fewer drive extents than the previous level of RAID protection, at least one of the drive extents allocated to the RAID extent may be selected for deallocation such that the range of the affinity values after deallocation of the drive extent is minimized.

In some embodiments, at least two RAID extents in the multiple RAID extents in the logical RAID space provide different levels of RAID protection.

In some embodiments, deallocation of the drive extent enables the drive extent to be reallocated to another one of the RAID extents in the RAID space.

In some embodiments, the change from the previous level of RAID protection to the new level of RAID protection for the one of the RAID extents may be performed in response to detecting a change in a faultiness level of the storage drives that contain the drive extents allocated to the RAID extent.

In some embodiments, detecting the change in the faultiness level of the storage drives containing the drive extents allocated to the RAID extent may include detecting a lower faultiness level of the storage drives containing the drive extents allocated to the RAID extent.

Embodiments of the disclosed technology may provide significant advantages over previous technical solutions. For example, by selecting a drive extent for deallocation based on minimization of the range of the values in the affinity matrix, the disclose technology operates in response to detecting that the number of drive extents allocated to a RAID extent is decreased in a way that improves (i.e. decreases) the average recovery time with regard to single drive failures, thus reducing the probability that a second physical data storage drive will fail during the failure recovery process, and accordingly reducing the likelihood of potential data loss caused by multiple concurrent drive failures.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 4 is a flow chart showing an example of steps that may be performed during operation of some embodiments.

DETAILED DESCRIPTION

Embodiments of the invention will now be described with reference to the figures. The embodiments described herein are provided only as examples, in order to illustrate various features and principles of the disclosed technology, and the invention is broader than the specific embodiments described herein.

The technology disclosed herein may be embodied to provide improvements over previous technologies by deallocating drive extents from RAID extents such that recovery time is improved with regard to single drive failures. To accomplish this, the disclosed technology calculates an affinity value for each pair of physical data storage drives in a protection group of physical data storage drives that is equal to a total number of RAID extents in a RAID space to which at least one drive extent is allocated from each of the physical data storage drives in the pair of physical data storage drives. The disclosed technology may then detect a change from a previous level of RAID protection to a new level of RAID protection provided by one of the RAID extents in the RAID space, and also detect that the new level of RAID protection uses fewer drive extents than the previous level of RAID protection provided for the RAID extent. The disclosed technology then selects one of the drive extents previously allocated to the RAID extent for deallocation such that the range of the affinity values (i.e. the difference between the highest and lowest affinity values) is minimized after deallocation of the drive extent.

Figure 1:
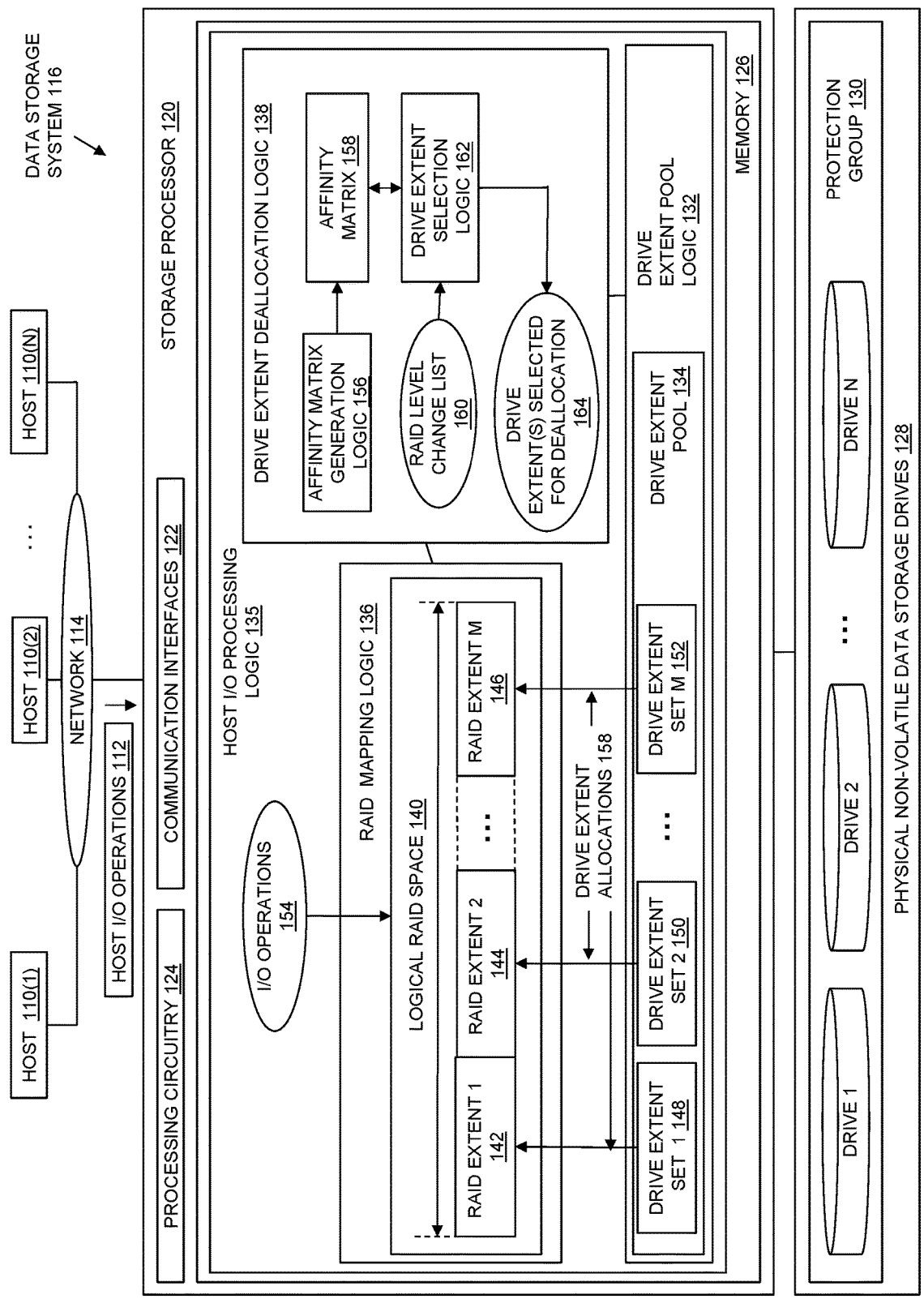
FIG. 1 is a block diagram showing an example of a data storage system in which an example of the disclosed technology is embodied.

FIG. 1 is a block diagram showing an operational environment for the disclosed technology, including an example of a data storage system in which the disclosed technology is embodied. FIG. 1 includes some number of physical or virtual Host Computing Devices 110, referred to as "hosts" and shown for purposes of illustration by Hosts 110(1) through 110(N). The hosts access data storage provided by Data Storage System 116, for example over one or more networks, such as a local area network (LAN), and/or a wide area network (WAN) such as the Internet, etc., and shown for purposes of illustration in FIG. 1 by Network 114. Data Storage System 116 includes at least one Storage Processor 120 and Physical Non-Volatile Data Storage Drives 128. No particular hardware configuration is required, and Storage Processor 120 may be embodied as any specific type of device that is capable of processing host input/output (I/O) operations received from Hosts 110 (e.g. I/O read and I/O write operations, etc.).

The Physical Non-Volatile Data Storage Drives 128 may include physical data storage drives such as solid state drives, magnetic disk drives, hybrid drives, optical drives, and/or other specific types of drives. Physical Non-Volatile Data Storage Drives 128 may be directly physically connected to and/or contained within Storage Processor 120, and/or may be communicably connected to Storage Processor 120 by way of one or more computer networks.

A Memory 126 in Storage Processor 120 stores program code that is executable on Processing Circuitry 124. Memory 126 may include volatile memory (e.g. RAM), and/or other types of memory. The Processing Circuitry 124 may, for example, include or consist of one or more microprocessors, e.g. central processing units (CPUs), multi-core processors, chips, and/or assemblies, and associated circuitry. Processing Circuitry 124 and Memory 126 together form control circuitry, which is configured and arranged to carry out various methods and functions as described herein. The Memory 126 stores a variety of software components that may be provided in the form of executable program code. For example, Memory 126 may include software components such as Host I/O Processing Logic 135. When program code in Memory 126 is executed by Processing Circuitry 124, Processing Circuitry 124 is caused to carry out the operations of the software components. Although certain software components are shown and described for purposes of illustration and explanation, those skilled in the art will recognize that Memory 126 may include various other software components, such as an operating system, various applications, other processes, etc.

During operation, Drive Extent Pool Logic 132 generates Drive Extent Pool 134 by first dividing each one of the physical non-volatile data storage drives in Protection Group 130 into multiple, equal size drive extents, each of which consists of physically contiguous non-volatile data storage located on a single drive. For example, Drive Extent Pool Logic 132 may divide each one of the physical non-volatile data storage drives in Protection Group 130 into a fixed number of equal size drive extents of physically contiguous non-volatile storage, and then add an indication of each one of the resulting drive extents to Drive Extent Pool 134. The Protection Group 130 from which Drive Extent Pool 134 is generated may consist of all the physical data storage drives in Array of Physical Non-Volatile Data Storage Drives 128, or only a subset of the physical data storage drives in Array of Physical Non-Volatile Data Storage Drives 128.

The size of the drive extents into which the physical non-volatile data storage drives in the Protection Group 130 are divided may, for example, be the same for every physical non-volatile data storage drive in Protection Group 130. Various specific sizes of drive extents may be used in different embodiments. For example, in some embodiments each drive extent may have a size of 10 gigabytes. Larger or smaller drive extent sizes may be used in the alternative. Any specific number of physical non-volatile data storage drives may be contained in the Protection Group 130 and divided into equal size drive extents to generate Drive Extent Pool 134.

Host I/O Processing Logic 135 allocates sets of multiple drive extents contained in the Physical Non-Volatile Data Storage Drives 128 through Drive Extent Pool 134 to individual logical RAID extents that are contained in Logical RAID Space 140. RAID Mapping Logic 136 contains data structures (e.g. one or more RAID mapping tables, etc.) that are used by RAID Mapping Logic 136 to associate each individual RAID extent with a corresponding logically contiguous region within Logical RAID Space 140, and to associate specific sets of drive extents allocated from Physical Non-Volatile Data Storage Drives 128 with their corresponding RAID extents. For purposes of illustration, allocations of sets of drive extents from Physical Non-Volatile Data Storage Drives 128 to RAID extents in Logical RAID Space 136 are shown by Drive Extent Allocations 158. In the example of FIG. 1, Logical RAID Space 140 contains M RAID extents, and a different set of drive extents is allocated from the Physical Non-Volatile Data Storage Drives 128 to each RAID extent. For example, Drive Extent Set 1 148 is allocated to RAID Extent 1 142, Drive Extent Set 2 150 is allocated to RAID Extent 2 144, and so on through Drive Extent M 152, which is allocated to RAID Extent M 146.

Logical RAID Space 136 includes multiple RAID extents, and provides a large logical address space. Each of the RAID extents included in Logical RAID Space 136 provides a corresponding level of RAID protection within a corresponding range of logical addresses within the large logical address space provided by Logical RAID Space 136. Host I/O Processing Logic 135 processes Host I/O Operations 112, and generates I/O Operations 154 to access RAID protected non-volatile data storage as needed to process Host I/O Operations 112. I/O Operations 154 indicate specific portions of non-volatile data storage using logical addresses within the Logical RAID Space 140. RAID Mapping Logic 136 includes RAID mapping tables and/or other mapping data structures, and maps each logical address referenced in I/O Operations 154 to the individual RAID extent that contains the logical address, e.g. the unique one of the RAID extents within Logical RAID Space 140 that corresponds to the contiguous range of logical addresses that contains the logical address. RAID Mapping Logic 136 further includes data structures that map each logical address referenced in I/O Operations 154 to the physical locations (e.g. the physical locations of the physical blocks within the relevant RAID stripe) that correspond to the logical address, within the drive extents that are allocated to the RAID extent that contains the logical address.

A corresponding level of RAID protection is separately and independently provided by each one of the RAID extents contained in Logical RAID Space 140. Accordingly, different ones of the RAID extents in Logical RAID Space 140 may provide different levels of RAID protection. For example, RAID Extent 1 142 may provide 4D+1P RAID-5 protection for host data written to logical addresses contained in RAID Extent 1 142, and RAID Extent 2 144 may provide 4D+2P RAID-6 protection for host data written to logical addresses contained in RAID Extent 2 144. Under some circumstances, each RAID extent in Logical RAID Space 140 may provide a different level of RAID protection.

Because each set of drive extents allocated to a RAID extent in Logical RAID Space 140 stores blocks of data and parity information in stripes that are defined by the RAID protection level corresponding to that RAID extent, RAID extents providing different corresponding RAID levels are allocated different numbers of drive extents. For example, in the case where RAID Extent 1 142 provides 4D+1P RAID-5 protection, Drive Extent Set 1 148 may contain five drive extents to separately store the four blocks of data and one block of parity information contained in each RAID stripe. Similarly, in the case where RAID Extent 2 144 provides 4D+2P RAID-6 protection, Drive Extent Set 2 150 may contain six drive extents to separately store the four blocks of data and one block of parity information contained in each RAID stripe.

Host I/O Processing Logic 135 may dynamically change the level of RAID protection provided by individual RAID extents in Logical RAID Space 140. For example, Host I/O Processing Logic 135 may automatically change the corresponding level of RAID protection provided by an individual RAID extent in response to detecting a change in the faultiness of the physical non-volatile data storage drives containing the drive extents that are allocated to the RAID extent. For example, Host I/O Processing Logic 135 may maintain a faultiness level for each physical non-volatile data storage drive in Protection Group 130. The faultiness level for a non-volatile data storage drive may include or consist of an indication of the likelihood that the physical non-volatile data storage drive will fail during the processing of a subsequent I/O operation, with higher faultiness levels indicating higher likelihoods of failure and lower faultiness levels indicating lower likelihoods of failure.

In response to detecting an increase in the faultiness level(s) of the physical non-volatile data storage drives containing the drive extents allocated to a specific RAID extent, Host I/O Processing Logic 135 may increase the corresponding level of RAID protection provided by that RAID extent. The faultiness level(s) of the data storage drives that contain the drive extents allocated to a RAID extent may, for example, increase over time due to degradation in the performance of data storage drives over time.

For example, Host I/O Processing Logic 135 may detect an increase in the faultiness levels of the physical non-volatile data storage drives containing the drive extents allocated to a RAID extent when the physical non-volatile data storage drives are solid state drives and the total amount of writes performed to each of the drives exceeds a threshold amount. In another example, Host I/O Processing Logic 135 may detect an increase in the faultiness levels of the physical non-volatile data storage drives containing the drive extents allocated to a RAID extent when an error rate is detected for I/O operations performed on each of the drives that exceeds a threshold error rate.

For example, in response to detecting an increase in the faultiness levels of the physical non-volatile data storage drives containing the drive extents in Drive Extent Set 1 148, Host I/O Processing Logic 135 may raise the corresponding level of RAID protection provided by RAID Extent 1 142 from 4D+1P RAID-5 to 4D+2P RAID-6.

In response to detecting a decrease in the faultiness level(s) of the physical non-volatile data storage drives containing the drive extents allocated to a RAID extent, Host I/O Processing Logic 135 may decrease the corresponding level of RAID protection provided for that RAID extent. The faultiness levels of the physical non-volatile data storage drives that contain the drive extents allocated to a RAID extent may, for example, decrease over time due to replacement of drive extents previously allocated to the RAID extent with newly allocated drive extents that are located in relatively newer non-volatile data storage drives, i.e. drive extents contained in physical non-volatile data storage devices that are relatively new in comparison to the physical data storage devices containing the drive extents that were previously allocated to the RAID extent. For example, relatively newer solid state drives (e.g. more recently added to Protection Group 130) may have relatively lower faultiness levels in comparison with the faultiness levels of relatively older solid state drives, e.g. when the total amount of write operations performed on the relatively newer solid state drives is less than a threshold amount, and the total amount of write operations performed on the relatively older solid state drives is greater than the threshold amount.

In another example, relatively newer physical data storage drives may have a relatively lower faultiness level than relatively older data storage drives because they have an error rate for I/O operations performed on them that is less than a threshold error rate, and the relatively older data storage drives have an error rate that is higher than the threshold error rate.

Host I/O Processing Logic 135 may replace drive extents previously allocated to a RAID extent with newly allocated drive extents, at least in part by copying previously stored host data from the previously allocated drive extents to the newly allocated drive extents. Such replacement may, for example, be performed by Host I/O Processing Logic 135 as part of or during a load balancing operation that improves the balance of utilization across resources within the Data Storage System 116.

For example, in response to detecting a decrease in the faultiness levels of the physical non-volatile data storage drives containing the drive extents in Drive Extent Set 2 150, Host I/O Processing Logic 135 may decrease the corresponding level of RAID protection provided by RAID Extent 2 144 from 4D+2P RAID-6 to 4D+1P RAID-5.

When Host I/O Processing Logic 135 increases the level of RAID protection provided by a RAID extent, Host I/O Processing Logic 135 may also increase the total number of drive extents in the set of drive extents allocated to the RAID extent. For example, in the case where Host I/O Processing Logic 135 increases the level of RAID protection corresponding to and provided by RAID Extent 1 142 from 4D+1P RAID-5 to 4D+2P RAID-6, Host I/O Processing Logic 135 increases the number of drive extents in Drive Extent Set 1 148 from five to six.

When Host I/O Processing Logic 135 decreases the level of RAID protection provided by a RAID extent, Host I/O Processing Logic 135 may decrease the total number of drive extents in the set of drive extents allocated to that RAID extent. For example, in the case where Host I/O Processing Logic 135 decreases the level of RAID protection corresponding to and provided by RAID Extent 2 144 from 4D+2P RAID-6 to 4D+1P RAID-5, Host I/O Processing Logic 135 decreases the number of drive extents in Drive Extent Set 2 150 from six to five.

When the number of drive extents in the set of drive extents allocated to a RAID extent is decreased, Drive Extent Deallocation Logic 138 selects at least one of the drive extents previously allocated to the RAID extent for deallocation. Drive Extent Deallocation Logic 138 calculates an affinity value for each pair of physical non-volatile data storage drives in Protection Group 130. The affinity value calculated by Drive Extent Deallocation Logic 138 for each pair of physical non-volatile data storage drives in Protection Group 130 is equal to the total number of RAID extents in Logical RAID Space 140 to which at least one drive extent is allocated from each one of the physical non-volatile data storage drives in the pair of physical non-volatile data storage drives. For example, the affinity value calculated by Drive Extent Deallocation Logic 138 for the pair of physical non-volatile data storage drives consisting of Drive 1 and Drive 2 Protection Group 130 is equal to the total number of RAID extents in Logical RAID Space 140 to which are allocated both i) at least one drive extent contained in Drive 1, and ii) at least one drive extent contained in Drive 2.

For example, in some embodiments, Affinity Matrix Generation Logic 156 may calculate an affinity value for each pair of physical non-volatile data storage drives in Protection Group 130 at least in part by generating an Affinity Matrix 158 for Protection Group 130. Each element in Affinity Matrix 158 corresponds to a pair of physical non-volatile data storage drives in Protection Group 130. Affinity Matrix Generation Logic 156 may generate Affinity Matrix 156 such that each element in Affinity Matrix 158 stores a value equal to the total number of RAID extents in Logical RAID Space 140 to which are allocated i) at least one drive extent contained in a first one of the physical non-volatile data storage drives in the corresponding pair of physical non-volatile data storage drives, and ii) at least one drive extent contained in a second one of the physical non-volatile data storage drives in the corresponding pair of physical non-volatile data storage drives. For example, Affinity Matrix Generation Logic 156 may initialize all the elements in Affinity Matrix 158 to zero, and then, for each element in Affinity Matrix 158, traverse the RAID extents contained in Logical RAID Space 140 and increment the value of the element for each RAID extent to which is allocated at least one drive extent contained in each one of the physical non-volatile data storage drives in the pair of physical non-volatile data storage drives corresponding to the element.

Drive Extent Deallocation Logic 138 detects when a previous level of RAID protection provided by at least one of the RAID extents in the Logical RAID Space 140 is changed to a new level of RAID protection. For example, in some embodiments, Drive Extent Selection Logic 162 may detect that a previous level of RAID protection provided by at least one of the RAID extents in Logical RAID Space 140 is changed to a new level of RAID protection in response to receipt of RAID Level Change List 160.

Host I/O Processing Logic 135 may, for example, generate a RAID Level Change List 160 at the time the level of RAID protection provided for at least one of the RAID extents in the Logical RAID Space 140 is changed. For example, RAID Level Change List 160 may be a list of RAID extents in Logical RAID Space 140 for which a previous level of RAID protection is being changed to a new level of RAID protection. Each entry in RAID Level Change List 160 may indicate a RAID extent for which the level of RAID protection is being changed, a previous level of RAID protection provided by that RAID extent, the new level of RAID protection to be provided by that RAID extent, and the non-volatile data storage drives on which are located the drive extents allocated to that RAID extent.

For each entry in RAID Level Change List 160, Drive Extent Selection Logic 162 may determine whether the new level of RAID protection to be provided by the corresponding RAID extent uses fewer drive extents than the previous level of RAID protection. For each RAID extent in the list for which the new level of RAID protection uses fewer drive extents than the previous level of RAID protection, Drive Extent Selection Logic 162 selects one of the drive extents previously allocated to the RAID extent for deallocation. Drive Extent Selection Logic 162 selects the previously allocated drive extent for deallocation such that the range of the affinity values (i.e. the difference between the highest affinity value and the lowest affinity value) resulting after deallocation of the selected drive extent is minimized. In other words, Drive Extent Selection Logic 162 selects a drive extent for deallocation from the drive extents previously allocated to the RAID extent such that the range of the values in the Affinity Matrix 158 after deallocation of the selected drive extent is the minimum range of the values in the Affinity Matrix 158 that can be achieved after deallocation of any one of the drive extents previously allocated to the RAID extent.

For example, RAID Level Change List 160 may include an entry that indicates that the RAID level corresponding to and provided by RAID Extent 2 144 is being decreased from 4D+2P RAID-6 to 4D+1P RAID-5. The decrease in RAID level for RAID Extent 2 144 may, for example, be triggered by Host I/O Processing Logic 135 detecting that previously allocated drive extents in Drive Extent Set 2 150 have been replaced (e.g. during a load balancing operation) by drive extents contained in non-volatile data storage drives having lower faultiness levels than the faultiness levels of the non-volatile data storage drives that contained the previously allocated drive extents. In response to detecting that the entry in RAID Level Change List 160 for RAID Extent 2 144 indicates that the RAID level provided by RAID Extent 2 144 is being decreased from 4D+2P RAID-6 to 4D+1P RAID-5, Drive Extent Selection Logic 162 may determine that the new level of RAID protection to be provided by RAID Extent 2 144 uses one fewer drive extent than was used by the previous level of RAID protection provided by RAID Extent 2 144, e.g. five drive extents instead of six drive extents. In response to the determination that the new level of RAID protection to be provided by RAID Extent 2 144 uses one fewer drive extent than the previous level of RAID protection provided by RAID Extent 2 144, Drive Extent Selection Logic 162 selects one of the drive extents in Drive Extent Set 2 150 for deallocation. For example, Drive Extent Selection Logic 162 selects one of the drive extents in Drive Extent Set 2 150 for deallocation such that the range of the resulting affinity values contained in Affinity Matrix 158 is minimized. In other words, Drive Extent Selection Logic 162 selects one of the drive extents in Drive Extent Set 2 150 for deallocation such that the range of the values in the Affinity Matrix 158 after deallocation of the selected drive extent is the minimum range of the values in the Affinity Matrix 158 that can be achieved after deallocation of any one of the drive extents in Drive Extent Set 2 150. For example, in some embodiments, Drive Extent Selection Logic 162 may generate a list of candidate drive extents consisting of all the drive extents previously allocated to RAID Extent 2 144 and currently contained in Drive Extent Set 2 150. Drive Extent Selection Logic 162 may then assign a range weighting to each one of the candidate drive extents in the list. The range weighting for each one of the candidate drive extents is calculated as the range of the values in the Affinity Matrix 158, with Affinity Matrix 158 modified to reflect deallocation of that candidate drive extent. For example, the range weighting for a first one of the drive extents in Drive Extent Set 2 150 may be calculated as the range of the values in Affinity Matrix 158 after modification of those values to reflect the possible deallocation of the first one of the drive extents in Drive Extent Set 2 150, the range weighting for a second one of the drive extents in Drive Extent Set 2 150 may be calculated as the range of the values in Affinity Matrix 158 after modification of those values to reflect the possible deallocation of the second one of the drive extents in Drive Extent Set 2 150, and so on for all six of the drive extents in Drive Extent Set 2 150. The range of the values in Affinity Matrix 158 may, for example, be calculated as the difference between the minimal (e.g. lowest) value and the maximal (e.g. highest) value in the Affinity Matrix 158. Drive Extent Selection Logic 162 then selects for deallocation the drive extent in the list of candidate drive extents having the lowest range weighting. In this way, the drive extent selected for deallocation is the drive extent whose deallocation causes the values in the Affinity Matrix 158 to have the smallest range of any of the candidate drive extents.

After processing all the entries in RAID Level Change List 160, Drive Extent Selection Logic 162 may then output indications of one or more drive extents that were selected by Drive Extent Selection Logic 162 for deallocation, as shown by Drive Extent(s) Selected for Deallocation 164. Each of the drive extents indicated by Drive Extent(s) Selected for Deallocation 164 are then deallocated, e.g. by Drive Extent Pool Logic 132, and are thus made available for reallocation through Drive Extent Pool 134. For example, the drive extent previously contained in Drive Extent Set 2 150 and deallocated from RAID Extent 2 144 is removed from Drive Extent Set 2 150, and made available for reallocation through Drive Extent Pool 134 to another one of the RAID extents in Logical RAID Space 140.

Figure 2:
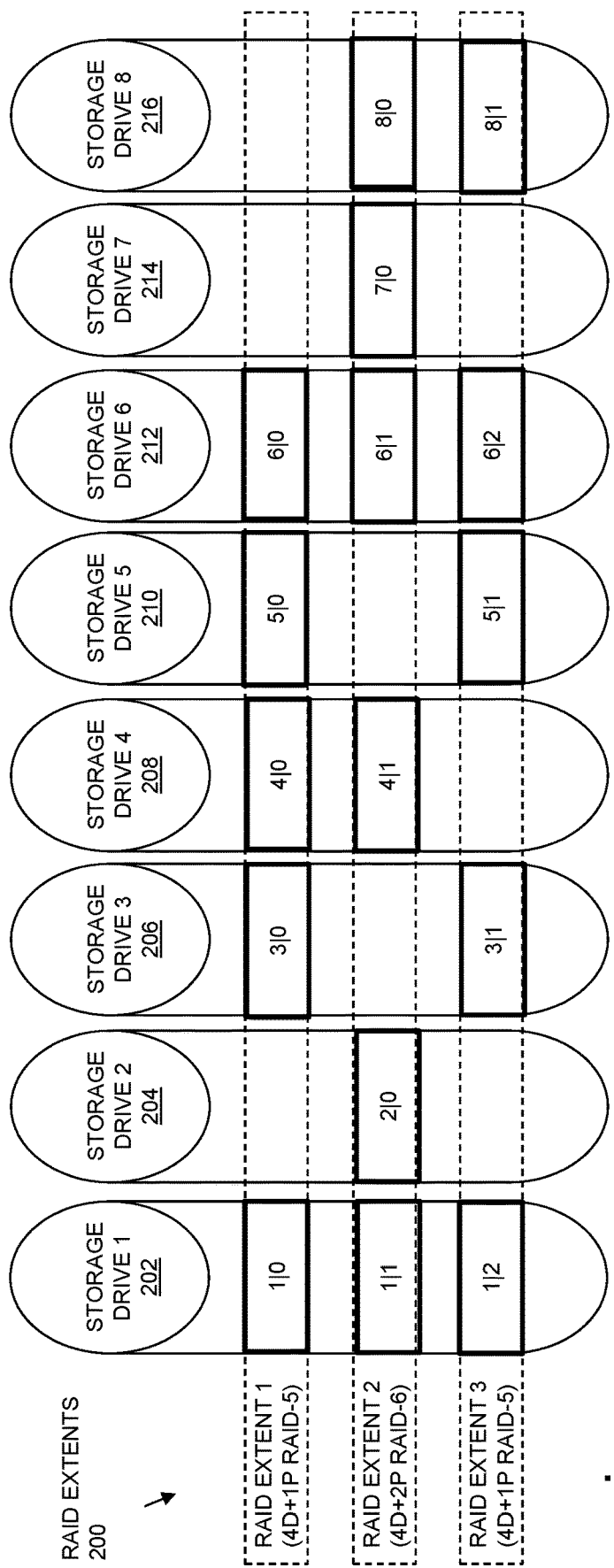
FIG. 2 is a block diagram showing an example of RAID extents contained in a RAID space in some embodiments.

FIG. 2 is a block diagram showing an example of drive extents allocated to individual RAID extents within the RAID Extents 200 that are contained in a logical RAID space in some embodiments. As shown in FIG. 2, RAID Extents 200 within a logical RAID space may include a RAID Extent 1 that provides 4D+1P RAID-5 level RAID protection, a RAID Extent 2 that provides 4D+2P RAID-6 level RAID protection, a RAID Extent 3 that provides 4D+1P RAID-5 level RAID protection, and some number of other RAID extents. As further shown in FIG. 2, an example of a protection group of non-volatile data storage drives may for purposes of concise illustration include eight non-volatile data storage drives, shown by Storage Drive 1 202, Storage Drive 2 204, Storage Drive 3 206, Storage Drive 4 208, Storage Drive 5 210, Storage Drive 6 212, Storage Drive 7 214, and Storage Drive 8 216. In order to provide 4D+1P RAID-5 level RAID protection, RAID Extent 1 is allocated five drive extents. In order to provide 4D+2P RAID-6 level RAID protection, RAID Extent 2 is allocated six drive extents. In order to provide 4D+1P RAID-5 level RAID protection, RAID Extent 3 is allocated five drive extents.

For example, RAID Extent 1 is allocated a set of five drive extents including a first drive extent 1|0, which is the first drive extent in Storage Drive 1 202, a second drive extent 3|0, which is the first drive extent in Storage Drive 3 206, a third drive extent 4|0, which is the first drive extent in Storage Drive 4 208, a fourth drive extent 5|0, which is the first drive extent in Storage Drive 5 210, and a fifth drive extent 6|0, which is the first drive extent in Storage Drive 6 212.

RAID Extent 2 is allocated a set of six drive extents including a first drive extent 1|1, which is the second drive extent in Storage Drive 1 202, a second drive extent 2|0, which is the first drive extent in Storage Drive 2 204, a third drive extent 4|1, which is the second drive extent in Storage Drive 4 208, a fourth drive extent 6|1, which is the second drive extent in Storage Drive 6 212, a fifth drive extent 7|0, which is the first drive extent in Storage Drive 7 214, and a sixth drive extent 8|0, which is the first drive extent in Storage Drive 8 216.

RAID Extent 3 is allocated a set of five drive extents including a first drive extent 1|2, which is the third drive extent in Storage Drive 1202, a second drive extent 3|1, which is the second drive extent in Storage Drive 3 206, a third drive extent 5|1, which is the second drive extent in Storage Drive 5 210, a fourth drive extent 6|2, which is the third drive extent in Storage Drive 6 212, and a fifth drive extent 8|1, which is the second drive extent in Storage Drive 8 216.

In an example of operation, when the level of RAID protection provided by RAID Extent 2 is decreased from 4D+2P RAID-6 to 4D+1P RAID-5, the disclosed technology (e.g. Drive Extent Selection Logic 162) selects one of the six drive extents allocated to Drive Extent 2 (e.g. 1|1, 2|0, 4|1, 6|1, 7|0, and 8|0) for deallocation. The disclosed technology selects the specific drive extent for deallocation from among the previously allocated drive extents such that after deallocation the values in the resulting modified affinity matrix have the smallest possible range (i.e. the smallest possible difference between the maximal and minimal values in the resulting matrix).

Figure 3:
FIG. 3 is a block diagram showing an example of an affinity matrix in some embodiments.

FIG. 3 shows an example of an Affinity Matrix 300 in some embodiments. Affinity Matrix 600 may, for example, be generated by Affinity Matrix Generation Logic 156. For purposes of concise illustration, the Affinity Matrix 300 is generated for a protection group of non-volatile data storage drives consisting of only four drives, e.g. Drive 1, Drive 2, Drive 3, and Drive 4. Each element of Affinity Matrix 300 is designated by AM(i,j), where i indicates a first one of the non-volatile data storage drives in the protection group, and j indicates a second one of the non-volatile data storage drives in the protection group.

Each element in Affinity Matrix 300 corresponds to a pair of non-volatile data storage drives in the protection group, and stores a value equal to the total number of RAID extents to which are allocated both i) at least one drive extent contained in a first one of the non-volatile data storage drives in the pair of non-volatile data storage drives corresponding to the element, and ii) at least one drive extent contained in a second one of the non-volatile data storage drives in the pair of non-volatile data storage drives corresponding to the element. Those skilled in the art will recognize that Affinity Matrix 300 is a symmetric matrix, in that the value of AM(i,j) is equal to the value of AM(j,i), and that the diagonal elements in which i equals j have a value of 0. The values of AM(1,1), AM(2,2), AM(3,3), and AM(4,4) are accordingly zero.

The value of AM(1,2) (and the value of AM(2,1)) is equal to the total number of RAID extents to which are allocated both at least one drive extent contained in Drive 1 and at least one drive extent contained in Drive 2.

The value of AM(1,3) (and the value of AM(3,1)) is equal to the total number of RAID extents to which are allocated both at least one drive extent contained in Drive 1 and at least one drive extent contained in Drive 3.

The value of AM(1,4) (and the value of AM(4,1)) is equal to the total number of RAID extents to which are allocated both at least one drive extent contained in Drive 1 and at least one drive extent contained in Drive 4.

The value of AM(2,3) (and the value of AM(3,2)) is equal to the total number of RAID extents to which are allocated both at least one drive extent contained in Drive 2 and at least one drive extent contained in Drive 3.

The value of AM(2,4) (and the value of AM(4,2)) is equal to the total number of RAID extents to which are allocated both at least one drive extent contained in Drive 2 and at least one drive extent contained in Drive 4.

The value of AM(3,4) (and the value of AM(4,3)) is equal to the total number of RAID extents to which are allocated both at least one drive extent contained in Drive 3 and at least one drive extent contained in Drive 4.

FIG. 4 is a flow chart showing an example of steps that may be performed during operation of some embodiments.

At step 400, mapped RAID protection is provided for data written into a logical RAID space, such that the RAID space includes multiple RAID extents, and such that each RAID extent independently provides a corresponding level of RAID protection, and such that multiple drive extents are allocated to each individual RAID extent from a protection group of storage drives.

At step 402, an affinity value is calculated for each pair of storage drives in the protection group that is equal to a total number of RAID extents to which at least one drive extent is allocated from each storage drive in the pair of storage drives.

At step 404, a change is detected from a previous level of RAID protection to a new level of RAID protection provided for one of the RAID extents, where the new level of RAID protection uses fewer drive extents than the previous level of RAID protection provided for the RAID extent.

At step 406, one of the drive extents allocated to the RAID extent is selected for deallocation such that the range of the modified affinity values resulting from the deallocation is minimized. The range in the affinity values may, for example, be calculated as the difference between the minimal (e.g. lowest) affinity value and the maximal (e.g. highest) affinity value.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
providing mapped RAID (Redundant Array of Independent Disks) protection for data written into a logical RAID space, wherein the RAID space includes multiple RAID extents, wherein each RAID extent independently provides a corresponding level of RAID protection, and wherein multiple drive extents are allocated to each individual RAID extent from a protection group of storage drives;
calculating an affinity value for each pair of storage drives in the protection group that is equal to a total number of RAID extents to which at least one drive extent is allocated from each storage drive in the pair of storage drives;
detecting a change from a previous level of RAID protection to a new level of RAID protection provided for one of the RAID extents, wherein the new level of RAID protection uses fewer drive extents than the previous level of RAID protection; and
selecting one of the drive extents allocated to the RAID extent for deallocation such that the range of the affinity values after deallocation of the drive extent is minimized, wherein the range of the affinity values after deallocation of the drive extent is minimized comprises a difference between a highest affinity value and a lowest affinity value after deallocation of the drive extent.

2. The method of claim 1, wherein calculating the affinity value for each pair of storage drives in the protection group further comprises:
generating an affinity matrix for the protection group, wherein each element in the affinity matrix for the protection group corresponds to a pair of storage drives contained in the protection group and stores a value equal to the total number of RAID extents in the RAID space to which are allocated i) at least one drive extent contained in a first one of the storage drives in the pair of storage drives, and ii) at least one drive extent contained in a second one of the storage drives in the pair of storage drives corresponding to the element.

3. The method of claim 2, wherein selecting one of the drive extents allocated to the RAID extent for deallocation such that the range of the affinity values after deallocation of the drive extent is minimized comprises:
selecting one of the drive extents allocated to the RAID extent for deallocation such that the range of the values stored in the elements of the affinity matrix after deallocation of the drive extent is minimized.

4. The method of claim 2, wherein selecting one of the drive extents allocated to the RAID extent for deallocation such that the range of the affinity values after deallocation of the drive extent is minimized comprises selecting a drive extent for deallocation from the drive extents previously allocated to the one of the RAID extents such that the range of the values in the affinity matrix after deallocation of the selected drive extent is a minimum range of the values in the affinity matrix that can be achieved after deallocation of any one of the drive extents previously allocated to the RAID extent.

5. The method of claim 1, wherein the new level of RAID protection for the RAID extent provides a lower level of RAID protection for the RAID extent than the previous level of RAID protection.

6. The method of claim 5, further comprising:
receiving a list of multiple RAID extents in the RAID space for which a previous level of RAID protection is being changed to a new level of RAID protection;
identifying those RAID extents in the list for which the new level of RAID protection uses fewer drive extents than the previous level of RAID protection; and
for each of those RAID extents in the list for which the new level of RAID protection uses fewer drive extents than the previous level of RAID protection, selecting at least one of the drive extents allocated to the RAID extent for deallocation such that the range of the affinity values after deallocation of the drive extent is minimized.

7. The method of claim 6, wherein at least two RAID extents in the multiple RAID extents in the logical RAID space provide different levels of RAID protection.

8. The method of claim 1, wherein deallocation of the drive extent enables the drive extent to be reallocated to another one of the RAID extents in the RAID space.

9. The method of claim 1, wherein the change from the previous level of RAID protection to the new level of RAID protection for the one of the RAID extents is performed in response to detecting a change in a faultiness level of the storage drives that contain the drive extents allocated to the RAID extent.

10. The method of claim 9, wherein detecting the change in the faultiness level of the storage drives containing the drive extents allocated to the RAID extent comprises detecting a lower faultiness level of the storage drives containing the drive extents allocated to the RAID extent.

11. A data storage system comprising:
at least one storage processor including processing circuitry and a memory;
a group of hard disk drives communicably coupled to the storage processor; and
wherein the memory has program code stored thereon, wherein the program code, when executed by the processing circuitry, causes the processing circuitry to:
provide mapped RAID (Redundant Array of Independent Disks) protection for data written into a logical RAID space, wherein the RAID space includes multiple RAID extents, wherein each RAID extent independently provides a corresponding level of RAID protection, and wherein multiple drive extents are allocated to each individual RAID extent from a protection group of storage drives,
calculate an affinity value for each pair of storage drives in the protection group that is equal to a total number of RAID extents to which at least one drive extent is allocated from each storage drive in the pair of storage drives,
detect a change from a previous level of RAID protection to a new level of RAID protection provided for one of the RAID extents, wherein the new level of RAID protection uses fewer drive extents than the previous level of RAID protection, and
select one of the drive extents allocated to the RAID extent for deallocation such that the range of the affinity values after deallocation of the drive extent is minimized, wherein the range of the affinity values after deallocation of the drive extent is minimized comprises a difference between a highest affinity value and a lowest affinity value after deallocation of the drive extent.

12. The data storage system of claim 11, wherein the program code, when executed by the processing circuitry, further causes the processing circuitry to calculate the affinity value for each pair of storage drives in the protection group at least in part by causing the processing circuitry to:
generate an affinity matrix for the protection group, wherein each element in the affinity matrix for the protection group corresponds to a pair of storage drives contained in the protection group and stores a value equal to the total number of RAID extents in the RAID space to which are allocated i) at least one drive extent contained in a first one of the storage drives in the pair of storage drives, and ii) at least one drive extent contained in a second one of the storage drives in the pair of storage drives corresponding to the element.

13. The data storage system of claim 12, wherein the program code, when executed by the processing circuitry, further causes the processing circuitry to select one of the drive extents allocated to the RAID extent for deallocation such that the range of the affinity values after deallocation of the drive extent is minimized at least in part by causing the processing circuitry to:
select one of the drive extents allocated to the RAID extent for deallocation such that the range of the values stored in the elements of the affinity matrix after deallocation of the drive extent is minimized.

14. The data storage system of claim 11, further comprising:
wherein the new level of RAID protection for the RAID extent provides a lower level of RAID protection for the RAID extent than the previous level of RAID protection.

15. The data storage system of claim 14, wherein the program code, when executed by the processing circuitry, further causes the processing circuitry to:
receive a list of multiple RAID extents in the RAID space for which a previous level of RAID protection is being changed to a new level of RAID protection;
identify those RAID extents in the list for which the new level of RAID protection uses fewer drive extents than the previous level of RAID protection; and
for each of those RAID extents in the list for which the new level of RAID protection uses fewer drive extents than the previous level of RAID protection, select at least one of the drive extents allocated to the RAID extent for deallocation such that the range of the affinity values after deallocation of the drive extent is minimized.

16. The data storage system of claim 15, wherein at least two RAID extents in the multiple RAID extents in the logical RAID space provide different levels of RAID protection.

17. The data storage system of claim 11, wherein deallocation of the drive extent enables the drive extent to be reallocated to another one of the RAID extents in the RAID space.

18. The data storage system of claim 11, wherein the change from the previous level of RAID protection to the new level of RAID protection for the one of the RAID extents is performed in response to detecting a change in a faultiness level of the storage drives that contain the drive extents allocated to the RAID extent.

19. The data storage system of claim 18, wherein the program code, when executed by the processing circuitry, further causes the processing circuitry to detect the change in the faultiness level of the storage drives containing the drive extents allocated to the RAID extent at least in part by causing the processing circuitry to detect a lower faultiness level of the storage drives containing the drive extents allocated to the RAID extent.

20. A computer program product including a non-transitory computer readable medium having instructions stored thereon, wherein the instructions, when executed on processing circuitry, cause the processing circuitry to perform the steps of:
providing mapped RAID (Redundant Array of Independent Disks) protection for data written into a logical RAID space, wherein the RAID space includes multiple RAID extents, wherein each RAID extent independently provides a corresponding level of RAID protection, and wherein multiple drive extents are allocated to each individual RAID extent from a protection group of storage drives;
calculating an affinity value for each pair of storage drives in the protection group that is equal to a total number of RAID extents to which at least one drive extent is allocated from each storage drive in the pair of storage drives;
detecting a change from a previous level of RAID protection to a new level of RAID protection provided for one of the RAID extents, wherein the new level of RAID protection uses fewer drive extents than the previous level of RAID protection; and
selecting one of the drive extents allocated to the RAID extent for deallocation such that the range of the affinity values after deallocation of the drive extent is minimized, wherein the range of the affinity values after deallocation of the drive extent is minimized comprises a difference between a highest affinity value and a lowest affinity value after deallocation of the drive extent.

* * * * *